US012608943B2

(12) United States Patent
Zhang et al.

(10) Patent No.: US 12,608,943 B2
(45) Date of Patent: Apr. 21, 2026

(54) METHOD AND DEVICE FOR CARGO INVENTORYING AND STORAGE MEDIUM

(71) Applicant: EFFITO PTE. LTD., Singapore (SG)

(72) Inventors: Zhiwei Zhang, Shenzhen (CN); Bingchuan Yang, Shenzhen (CN)

(73) Assignee: EFFITO PTE. LTD., Singapore (SG)

( * ) Notice: Subject to any disclaimer, the term of this patent is extended or adjusted under 35 U.S.C. 154(b) by 485 days.

(21) Appl. No.: 18/317,419

(22) Filed: May 15, 2023

(65) Prior Publication Data

US 2023/0386211 A1 Nov. 30, 2023

(30) Foreign Application Priority Data

May 26, 2022 (CN) .......................... 202210580926.7

(51) Int. Cl.
*G06V 20/50* (2022.01)
*G06Q 10/087* (2023.01)

(52) U.S. Cl.
CPC ........... *G06V 20/50* (2022.01); *G06Q 10/087* (2013.01)

(58) Field of Classification Search
CPC .............................. G06V 20/50; G06Q 10/087
See application file for complete search history.

(56) References Cited

U.S. PATENT DOCUMENTS

2015/0339516 A1* 11/2015 Yano .......................... G06T 7/74
382/118
2019/0132472 A1* 5/2019 Ogata ................... H04N 1/2141
2020/0193196 A1 6/2020 Saydag
(Continued)

FOREIGN PATENT DOCUMENTS

CN 110532978 A 12/2019
CN 111612398 A 9/2020
(Continued)

OTHER PUBLICATIONS

"Save and load machine learning models with Python scikit-learn", Machine Learning Deep Learning, Aug. 7, 2017, Retrieved from internet URL: https://web.archive.org/web/20170807010352/https:/localab.jp/blog/save-and-load-machine-learning-models-in-python-with-scikit-learn/ on Nov. 25, 2024, 24 pages.
(Continued)

*Primary Examiner* — Casey L Kretzer
(74) *Attorney, Agent, or Firm* — Getech Law LLC; Jun Ye

(57) ABSTRACT

A method and a device for cargo inventorying and a storage medium are provided in the disclosure. A storage-space image is obtained, where the storage-space image is obtained by performing image acquisition on at least one storage-space where cargoes are stored. A detection result is obtained by performing inference detection on the storage-space image. In addition, a result of cargo inventorying on the storage space is obtained by emphasizing cargoes in the storage-space image according to the detection result. In the disclosure, the detection result can be produced automatically by performing inference detection on the storage-space image. Based on the detection result produced automatically, it is also able to automatically emphasize the cargoes in the storage-space image and realize automatic inventory of cargoes by programmed automatic-control, thereby improving the efficiency of cargo inventorying.

19 Claims, 6 Drawing Sheets

(56)                References Cited

U.S. PATENT DOCUMENTS

| | | | | |
|---|---|---|---|---|
| 2020/0223431 A1* | 7/2020 | Zass | ..................... | B60W 30/09 |
| 2020/0302214 A1* | 9/2020 | Arani | ................... | G06N 3/0495 |
| 2021/0056497 A1* | 2/2021 | Engedal | ................... | G06T 7/13 |
| 2022/0058511 A1 | 2/2022 | Mccusker et al. | | |

FOREIGN PATENT DOCUMENTS

| | | | |
|---|---|---|---|
| CN | 112132523 A | 12/2020 | |
| CN | 112465794 A | 3/2021 | |
| CN | 112711423 A | 4/2021 | |
| CN | 113538826 A | 10/2021 | |
| CN | 113657317 A | 11/2021 | |
| JP | 2020055672 A | 4/2020 | |

OTHER PUBLICATIONS

JP2023081268—Decision of Rejection mailed on Nov. 29, 2024, 11 pages.
CN202211143664.4—First Office Action mailed on Apr. 10, 2025, 11 pages.
JP2023081268—Notice of Reasons for Refusal mailed on Jul. 10, 2024, 10 pages.
EP23173437.7—Extended European Search Report mailed on Oct. 5, 2023, 58 pages.

* cited by examiner

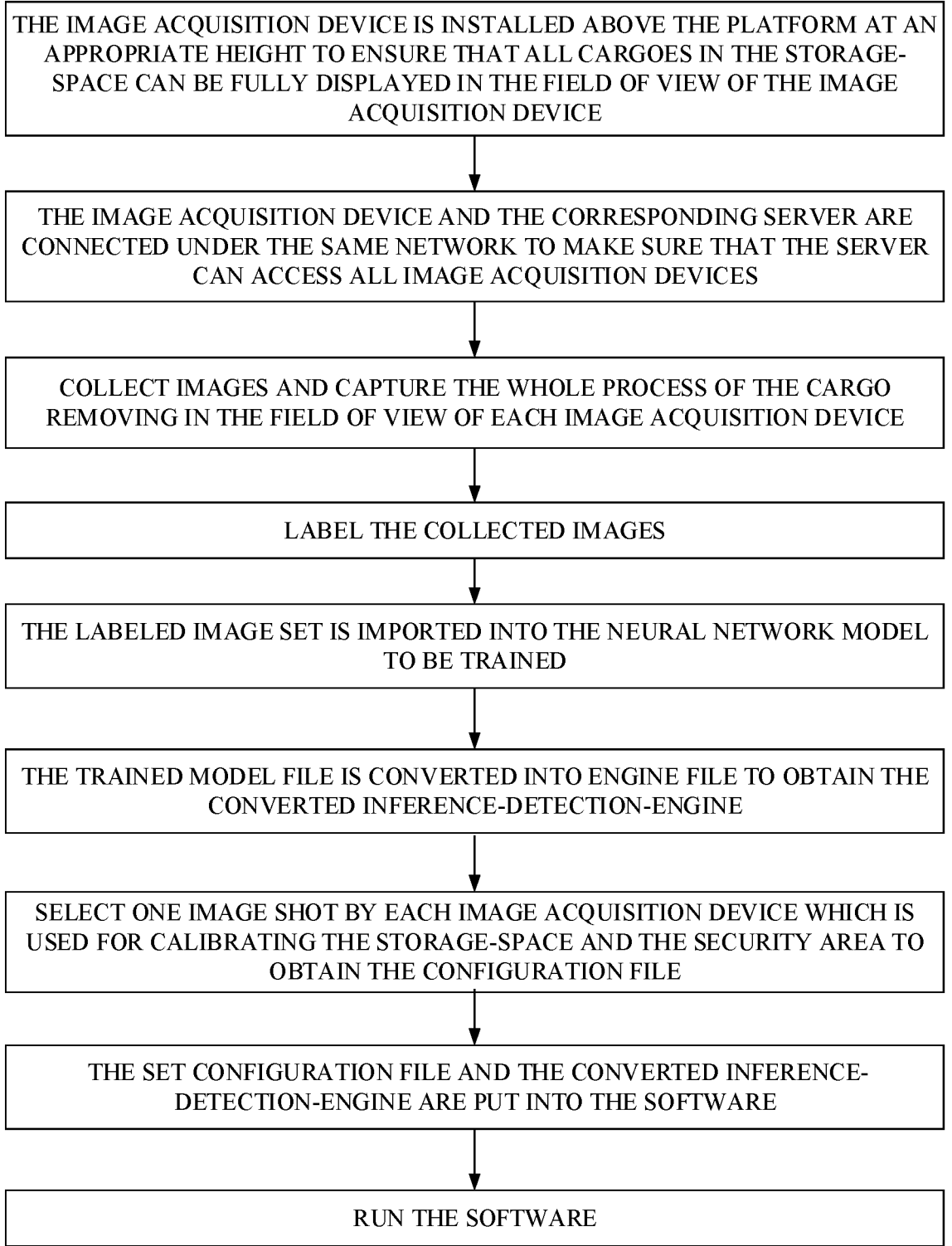

THE IMAGE ACQUISITION DEVICE IS INSTALLED ABOVE THE PLATFORM AT AN APPROPRIATE HEIGHT TO ENSURE THAT ALL CARGOES IN THE STORAGE-SPACE CAN BE FULLY DISPLAYED IN THE FIELD OF VIEW OF THE IMAGE ACQUISITION DEVICE

THE IMAGE ACQUISITION DEVICE AND THE CORRESPONDING SERVER ARE CONNECTED UNDER THE SAME NETWORK TO MAKE SURE THAT THE SERVER CAN ACCESS ALL IMAGE ACQUISITION DEVICES

COLLECT IMAGES AND CAPTURE THE WHOLE PROCESS OF THE CARGO REMOVING IN THE FIELD OF VIEW OF EACH IMAGE ACQUISITION DEVICE

LABEL THE COLLECTED IMAGES

THE LABELED IMAGE SET IS IMPORTED INTO THE NEURAL NETWORK MODEL TO BE TRAINED

THE TRAINED MODEL FILE IS CONVERTED INTO ENGINE FILE TO OBTAIN THE CONVERTED INFERENCE-DETECTION-ENGINE

SELECT ONE IMAGE SHOT BY EACH IMAGE ACQUISITION DEVICE WHICH IS USED FOR CALIBRATING THE STORAGE-SPACE AND THE SECURITY AREA TO OBTAIN THE CONFIGURATION FILE

THE SET CONFIGURATION FILE AND THE CONVERTED INFERENCE-DETECTION-ENGINE ARE PUT INTO THE SOFTWARE

RUN THE SOFTWARE

FIG. 3

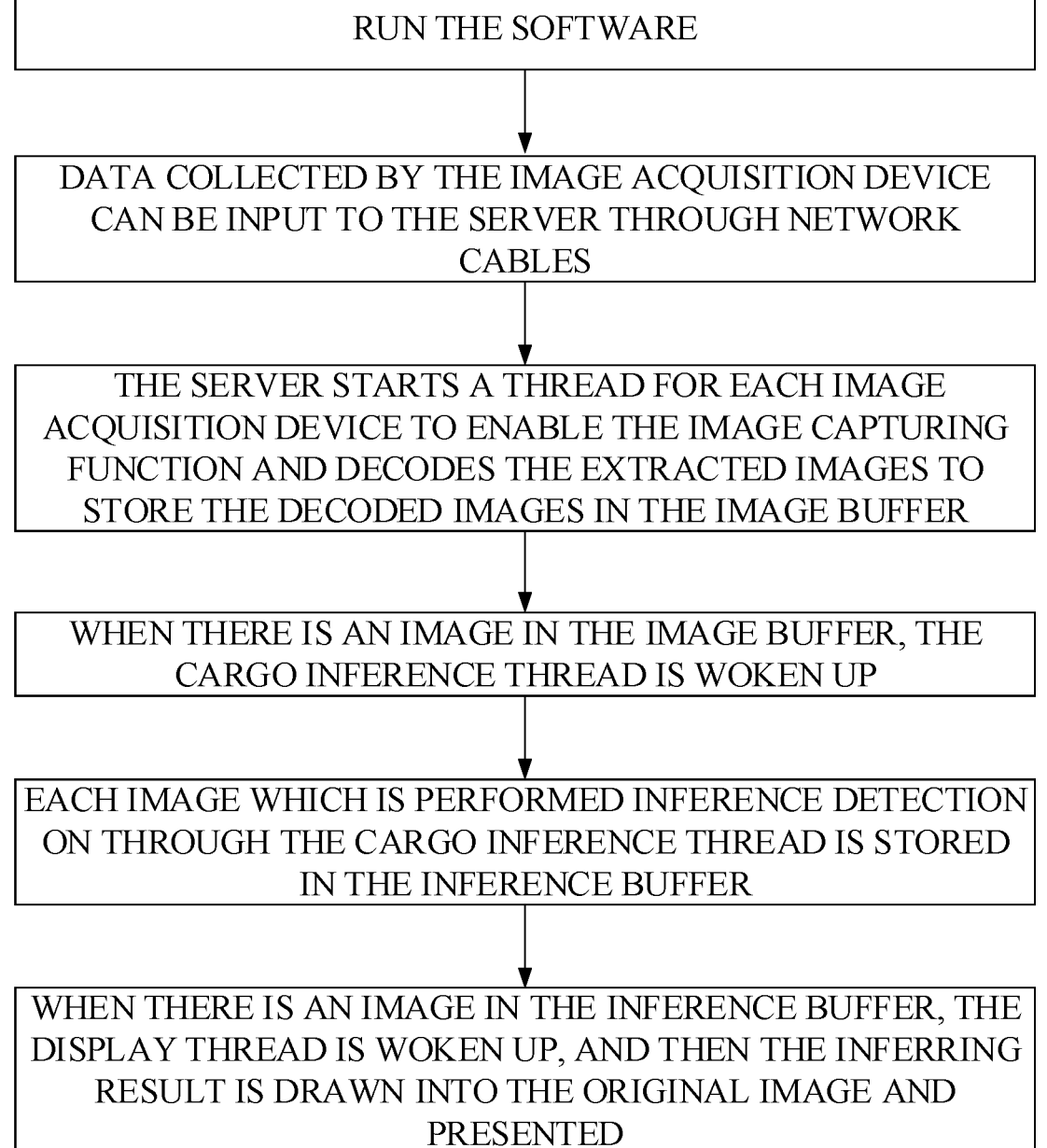

RUN THE SOFTWARE

DATA COLLECTED BY THE IMAGE ACQUISITION DEVICE CAN BE INPUT TO THE SERVER THROUGH NETWORK CABLES

THE SERVER STARTS A THREAD FOR EACH IMAGE ACQUISITION DEVICE TO ENABLE THE IMAGE CAPTURING FUNCTION AND DECODES THE EXTRACTED IMAGES TO STORE THE DECODED IMAGES IN THE IMAGE BUFFER

WHEN THERE IS AN IMAGE IN THE IMAGE BUFFER, THE CARGO INFERENCE THREAD IS WOKEN UP

EACH IMAGE WHICH IS PERFORMED INFERENCE DETECTION ON THROUGH THE CARGO INFERENCE THREAD IS STORED IN THE INFERENCE BUFFER

WHEN THERE IS AN IMAGE IN THE INFERENCE BUFFER, THE DISPLAY THREAD IS WOKEN UP, AND THEN THE INFERRING RESULT IS DRAWN INTO THE ORIGINAL IMAGE AND PRESENTED

FIG. 4

METHOD AND DEVICE FOR CARGO INVENTORYING AND STORAGE MEDIUM

CROSS-REFERENCE TO RELATED APPLICATIONS

This application claims priority under 35 U.S.C. § 119(a) to and the benefit of Chinese Patent Application No. 202210580926.7, filed May 26, 2022, the entire disclosure of which is incorporated herein by reference.

TECHNICAL FIELD

This disclosure relates to the field of logistics application technology, particularly to a method and a device for cargo inventorying and a storage medium.

BACKGROUND

The demand for cargoes is increasing with the development of logistics industry, and it is needed to take an inventory of cargoes in many cargoes-handling scenarios, therefore the efficiency of cargo inventorying is crucial.

At present, cargo inventorying is mainly performed manually, however, such manual inventory is inefficient.

SUMMARY

In a first aspect, a method for cargo inventorying is provided in the disclosure. The method includes obtaining a storage-space image, where the storage-space image is obtained by performing image acquisition on at least one storage-space where cargoes are stored; obtaining a detection result by performing inference detection on the storage-space image; and obtaining a result of cargo inventorying on the storage space by emphasizing cargoes in the storage-space image according to the detection result.

In a second aspect, a device for cargo inventorying is further provided in the disclosure. The device includes a processor and a memory storing computer programs, where when executing the computer programs, the processor is configured to obtain a storage-space image, where the storage-space image is obtained by performing image acquisition on at least one storage-space where cargoes are stored; obtain a detection result by performing inference detection on the storage-space image; and obtain a result of cargo inventorying on the storage space by emphasizing cargoes in the storage-space image according to the detection result.

In a third aspect, a nonvolatile computer-readable storage medium storing computer programs is provided in the disclosure. When executing the computer programs, a processor is configured to obtain a storage-space image, where the storage-space image is obtained by performing image acquisition on at least one storage-space where cargoes are stored; obtain a detection result by performing inference detection on the storage-space image; and obtain a result of cargo inventorying on the storage space by emphasizing cargoes in the storage-space image according to the detection result.

For the method and the device for cargo inventorying and the nonvolatile computer-readable storage medium, a storage-space image is obtained, where the storage-space image is obtained by performing image acquisition on at least one storage-space where cargoes are stored. A detection result is obtained by performing inference detection on the storage-space image. In addition, a result of cargo inventorying on the storage space is obtained by emphasizing cargoes in the storage-space image according to the detection result. In the disclosure, the detection result can be produced automatically by performing inference detection on the storage-space image. Based on the detection result produced automatically, it is also able to automatically emphasize the cargoes in the storage-space image and realize automatic inventory of cargoes by programmed automatic-control, thereby improving the efficiency of cargo inventorying.

BRIEF DESCRIPTION OF THE DRAWINGS

FIG. 3 is a flow chart of a method for cargo inventorying provided in other implementations.

FIG. 4 is a flow chart of data flow of software in some implementations.

DETAILED DESCRIPTION

In order to make the purposes, technical solutions, and advantages of the disclosure clearer, the following will describe the disclosure in detail with combination of accompanying drawings and implementations. It should be understood that, specific implementations described herein are merely for explaining, rather than limiting, the disclosure.

Figure 1:
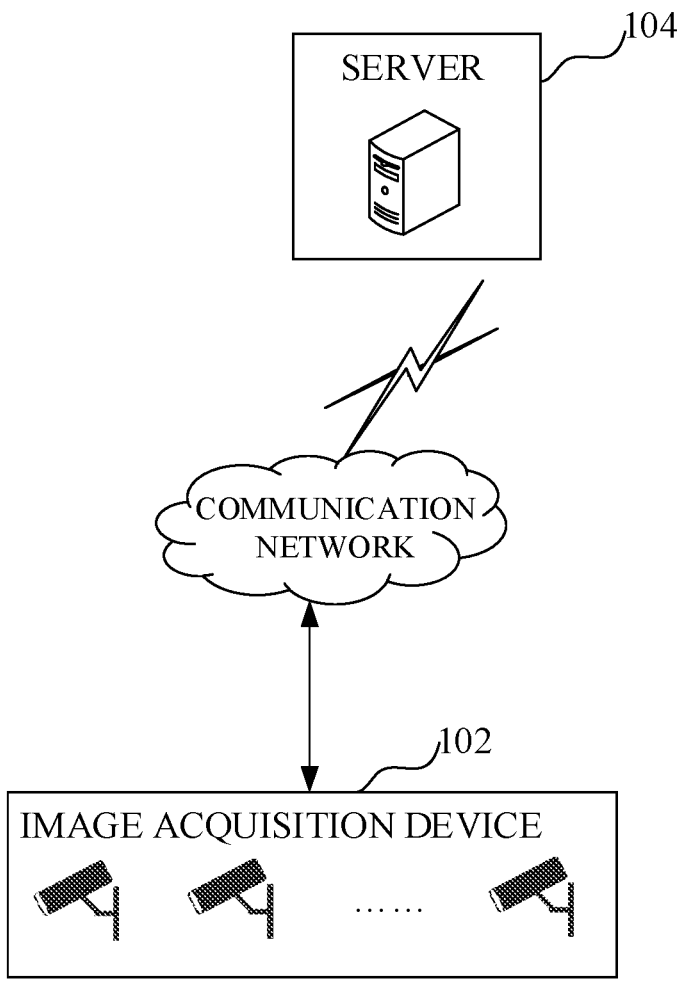
FIG. 1 is a schematic diagram of application scenarios of a method for cargo inventorying provided in some implementations.

A method for cargo inventorying provided in implementations of the disclosure is applicable to an application scenario illustrated in FIG. 1. As illustrated in FIG. 1, an image acquisition device 102 for image acquisition and a server 104 at the other end need to access a same network to make sure that the server 104 can access all image acquisition devices 102. The server 104 communicates with the image acquisition device 102 via the network. The image acquisition device 102 is configured to perform image acquisition on a storage space where cargoes are stored to obtain a storage-space image (also referred to as storage-space map). The image acquisition device 102 is also able to send the collected storage-space image to the server 104, such that the server 104 can perform cargo inventorying. Specifically, the server 104 performs inference detection on the storage-space image with an inference detection engine integrated in the server 104 to obtain a detection result after receiving the storage-space image. The inference detection engine is obtained by serializing model parameters of a cargo detection model trained through deep learning, and an inference detection speed of the inference detection engine is superior to the cargo detection model. Finally, the server 104 emphasizes cargoes in the storage-space image according to the detection result, and then obtains a result of cargo inventorying on the storage space. The number of the image acquisition device 102 may be one or more, and the server 104 may be a standalone server or a server cluster composed of multiple servers.

The storage space refers to a specific space for storing cargoes in the warehouse. The storage-space information can be obtained with two statistical methods: (1) overview of storage space, which shows the number of cargoes in a certain storage space of a certain warehouse; (2) distribution of cargoes in a storage space, where categories and the number of cargoes stored in each storage space of a certain warehouse can be checked.

Figure 2:
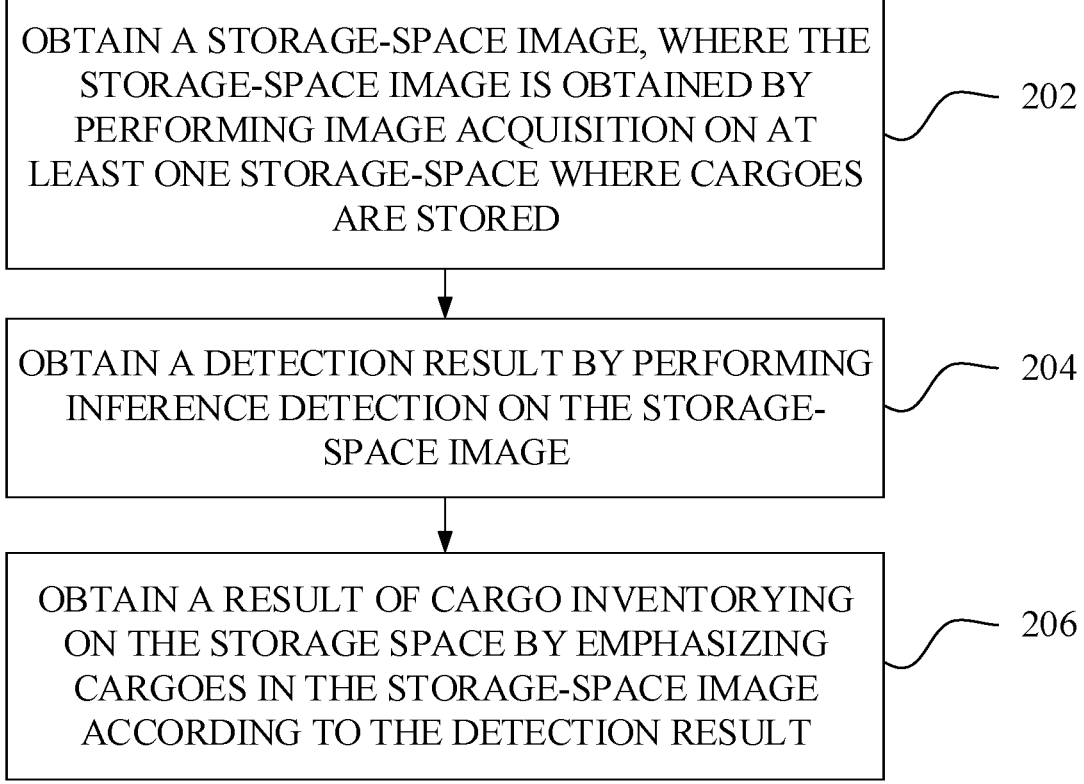
FIG. 2 is a flow chart of a method for cargo inventorying provided in some implementations.

In some implementations, a method for cargo inventorying is provided. The method can be performed by a computer. The method can be applied to the server or realized through interaction between the server and the image acquisition device, which is not limited herein. As illustrated in FIG. 2, the method applied to the server illustrated in FIG. 1 is taken as an example and includes the following steps.

At 202, obtain a storage-space image, where the storage-space image is obtained by performing image acquisition on at least one storage-space where cargoes are stored.

The storage-space image in the disclosure is obtained by performing image acquisition with an image acquisition device. Image acquisition devices refer to devices having a photographing function, which may be, but are not limited to, various cameras and mobile devices integrated with shooting apparatuses such as cameras.

The storage space refers to an area in the warehouse which is used to store cargoes and is generally rectangular. The storage-space image refers to an image obtained by the image acquisition device through image acquisition on a certain storage-space or multiple storage-spaces. The storage-space image can present one or more storage-spaces, as well as cargo status in each storage-space. It can be understood that, the storage-space image may contain only the storage space, and may further contain other areas such as security areas, which is not limited. As long as there is a storage space in the storage-space image, requirements for realizing technical solutions of the disclosure can be satisfied.

Security area refers to an area around the storage space, which is used for alarm prompt. For example, if it is identified that a person or a forklift has entered a security area, an alarm prompt is generated. It should be noted that the security area may be polygonal, and the number of vertices, area size, and location of the security area can be set according to actual needs.

Specifically, the server obtains the storage-space image of the storage space storing cargoes which is collected by the image acquisition device, and the storage-space image is used for subsequent inference detection.

At 204, obtain a detection result by performing inference detection on the storage-space image.

The detection result is obtained by performing inference detection on the storage-space image with the inference detection engine. The inference detection engine may be integrated in the server, and the inference detection engine is obtained by serializing model parameters of a cargo detection model trained through deep learning. An inference detection speed of the inference detection engine is superior to the cargo detection model. The cargo detection model built through a deep learning algorithm is able to automatically find the most accurate features, thus improving the accuracy of cargo detection. The inference can be further optimized and the accuracy of cargo detection can be further improved by converting the cargo detection model trained by deep learning into the inference detection engine.

Deep learning refers to learning the internal rules and presentation levels of sample data, and text, images, voice and other data can be identified during the learning.

The cargo detection model refers to a target detection-algorithm-model trained through deep-learning algorithms and is used for cargo detection and identification. It can be understood that, the cargo detection model may be a multi-classification model, that is, the cargo detection model is not limited to detecting and identifying cargoes, and can also identify other objects such as a person or a forklift.

The inference detection engine refers to an inference optimizer that optimizes the trained cargo detection model. The inference detection engine can optimize inference, identify various cargoes more accurately, and further accelerate deployment.

The process of converting the cargo detection model into the inference detection engine includes converting the format of the model file corresponding to the trained cargo detection model to the format of the file corresponding to the inference detection engine, and generating the engine file. Specifically, the cargo detection model is imported into the inference detection engine to generate the engine file, and then the engine file is serialized and saved, such that the saved engine file can be easily and quickly invoked subsequently to perform accelerated inference of the cargo detection model.

In practical applications, tensorrt can be selected as the inference detection engine of the disclosure, and a yolov5 model can be selected as the cargo detection model of the disclosure. Tensorrt is an inference framework in C++, which can run on various hardware platforms provided with a graphics processing unit (GPU), and the yolov5 model is a neural network model built through a single-stage target-detection-algorithm.

Based on this, the process of converting the cargo detection model into the inference detection engine can further include converting the model file generated by the trained cargo detection model into tensorrt engine file, i.e., converting PT model file into ENGINE tensorrt engine file. The reason for doing so is that the software system of the disclosure adopts the tensorrt deployment scheme, which is faster than the traditional scheme and consumes less resources. The principle of tensorrt is to serialize the model parameters of the cargo detection model and then obtain tensorrt through convertion, and subsequent input-data can be directly put into the serialized tensorrt for inference. Therefore, the yolov5 model is defined through tensorrt development kit, and specifically, the yolov5 model may correspond to v5.0 network structure, and then PT model file is converted into ENGINE tensorrt engine file for subsequent use of the software.

Specifically, the detection result is obtained by performing inference detection on cargoes in the storage-space image collected by the image acquisition device with the inference detection engine integrated in the server. The detection result contains the identified storage-space and the cargo status in the storage space, such as categories and the number of cargoes.

It should be noted that, the inference detection engine can not only identify and detect storage spaces and cargoes, but also identify a security area, a person and a forklift, and obtain a corresponding detection result. Specifically, the detection result contains the identified storage-space and the cargo status in the storage space, such as categories and the number of cargoes. Furthermore, the detection result contains existence or non-existence of a person or a forklift in the non-storage-space area such as a security area. An alarm is generated when detecting that there is a person or a forklift in the security area, for example, an alarm prompt is generated.

At 206, obtain a result of cargo inventorying on the storage space by emphasizing cargoes in the storage-space image according to the detection result.

Emphasizing cargoes refers to emphasizing the location of cargoes in the storage-space image, so that users can know more clearly the specific orientation of cargoes in the storage-space image. Emphasizing includes at least one of, but is not limited to, highlighting, color filling, text marking for the cargoes, and drawing an area detection box corresponding to the cargoes according to the identified cargoes.

Specifically, the result of cargo inventorying on the storage space is obtained by emphasizing cargoes in the storage-space image according to the detection result, that is, such as categories and the number of cargoes in each storage-space corresponding to the storage-space image are obtained. It can be understood that, the server can display the storage-space image with the cargoes emphasized on a display device.

The method for cargo inventorying mentioned above includes obtaining the storage-space image; obtaining the detection result by performing inference detection on the storage-space image; and obtaining the result of cargo inventorying on the storage space by emphasizing cargoes in the storage-space image according to the detection result. In the disclosure, the detection result can be produced automatically by performing inference detection on the storage-space image. Based on the detection result produced automatically, it is also able to automatically emphasize the cargoes in the storage-space image and realize automatic inventory of cargoes by programmed automatic-control, thereby improving the efficiency of cargo inventory.

In some implementations, steps of training the cargo detection model is further included before step 204. Specifically, the training steps include capturing process images during cargo removing in any storage-space by an image acquisition device corresponding to the any storage-space to generate a training-image set; and obtaining the cargo detection model by training an original detection model according to the training-image set.

The image acquisition device needs to be installed in an appropriate position, for example, the image acquisition device is installed on two opposite sides of the storage space, so as to ensure that the cargoes in the storage space can fall completely into a field of view of the image acquisition device. It should be noted that if cargoes need to be stacked, it is necessary to ensure that all stacked cargoes are in the field of view of the image acquisition device. In addition, the original detection model is the initial neural-network-model to be trained.

Specifically, the installed image acquisition device and the corresponding server access the same network to make sure that the server can access all image acquisition devices. The image acquisition function of the image acquisition device is turned on through the server, and then the whole process of the cargo removing in the storage-space in the field of view of each image acquisition device, i.e., the process images, are captured to obtain the training-image set used for training. Next, each process image in the training-image set is labeled to obtain a labeled image set, where the labeled types include, but are not limited to, at least one of a person, a forklift, and a cargo. The labeled image set is input into the original detection model for training to obtain the optimal model parameters. The original detection model is updated according to the optimal model parameters to obtain the trained cargo detection model. The original detection model may adapt the yolov5 model. The obtained cargo detection model trained based on the yolov5 model has high inference speed, occupies small space and has higher accuracy.

In some implementations, an image capturing function in the software development kit (SDK) developed based on the image acquisition device can also be called by the server to collect images after the image acquisition function of the image acquisition device is turned on. An SDK is generally a collection of development tools used by some software engineers to build application software for specific software packages, software frameworks, hardware platforms, and operating systems, etc.

In some implementations, step 202 includes specifically, but is not limited to, obtaining the storage-space image collected by the image acquisition device and storing the storage-space image in an image buffer.

The image buffer is used to cache images captured by the image acquisition device of the corresponding thread.

Specifically, the image data collected by the image acquisition device can be input to the server through the network cable. The server turns on a thread for each image acquisition device, invokes the image capturing function in the thread to extract the storage-space image from the video stream collected by the image acquisition device, and decodes the storage-space image and stores the decoded image in the image buffer.

It should be noted that, the decoded images are stored in vector container of a memory as a mat object in OpenCV and is automatically released after the processing is completed. OpenCV is a cross-platform computer vision and machine learning software library. Mat object is a memory object used to store image information in OpenCV, which can be regarded as a pixel matrix containing all intensity values. Vector container is a sequence container that encapsulates a dynamic array.

In some implementations, step 204 specifically includes, but is not limited to, waking up a cargo inference thread to obtain the storage-space image from the image buffer through the cargo inference thread, and calling the inference detection engine to perform inference detection on the storage-space image to obtain the detection result.

The cargo inference thread is used to perform inference on the storage-space image in the image buffer.

Specifically, the cargo inference thread is woken up once there is an image in the image buffer. After woken up, the cargo inference thread obtains the storage-space image from the image buffer, and calls the inference detection engine to perform inference detection on the storage-space image to obtain the detection result. The detection result contains identified storage-space and cargo status in the storage space, such as categories and the number of cargoes.

In some implementations, the storage space image is obtained through the image collection thread turned up for the image acquisition device. In this case, the method for cargo inventorying specifically includes, but is not limited to, controlling, through the image collection thread, the image acquisition device to stop image acquisition within a preset time period, when the number of images stored in the image buffer has reached a preset threshold. For example, an acquisition-suspending notification can be sent to the image collection thread.

Specifically, the number of images stored in the image buffer is determined to be the number of stored images. When the number of stored images has reached the preset threshold, i.e., the number of stored images has reached the upper limit of the buffer size, which makes the image buffer unable to store more images, the acquisition-suspending notification is sent to the image collection thread to control, through the image collection thread, the image acquisition device to stop image acquisition within the preset time period (such as in 10 ms). The image acquisition device can perform image acquisition normally when the number of stored images does not reach the preset threshold.

It can be understood that, the reason for disposing the image buffer is that the image capturing speed of the image acquisition device is different from the inference speed of the cargo inference thread in a practical application. An example is given below for convenience of understanding. It is assumed that, the time for the image acquisition device to capture an image is about 50 ms (the specific capture-time depends on the model of different image acquisition devices), and the time for the cargo inference thread to infer an image is about 10 ms (the specific inference-speed depends on the model of different graphics cards). Assuming that there are 10 image acquisition devices running at the same time, since the image capturing time of the image acquisition devices is synchronous, it is equivalent to capturing 10 images in 50 ms. However, the cargo inference thread can only process 5 images in 50 ms, which will result in the existence of unprocessed images, and thus it will cause a large number of overstocked images if the image acquisition device continues capturing images. Considering the above situation, the image buffer is used in the disclosure. Images captured by the image acquisition device are put into the image buffer through the image collection thread, the image buffer constantly informs the cargo inference thread performing inference detection as long as there is an image in the image buffer. If the image buffer is full, the image buffer informs the image collection thread to stop capturing images, so that the image capturing speed of the image acquisition device is consistent with the inference speed of the cargo inference thread.

In some implementations, the detection result can be stored in an inference buffer after the cargo inference thread calls the inference detection engine to perform inference detection to obtain the detection result, where the inference buffer is used to cache the cargo inference thread and a cargo display thread. The cargo display thread is woken up when the detection result and the corresponding storage-space image exist in the inference buffer, and after the cargo display thread extracts the detection result and the corresponding storage-space image (i.e., the original image before the inference detection) from the inference buffer, the detection result is drawn into the original image and shown in, and specifically, the number of the cargoes in the storage space is shown.

It should be noted that, the image collection thread, the cargo inference thread and the cargo display thread of implementations of the disclosure are independent threads, and a thread is set for each image acquisition device in implementations of the disclosure to ensure that images acquired by each image acquisition device can be obtained at the same time.

In some implementations, step 204 includes, but is not limited to, determining a target storage-space by detecting the at least one storage-space corresponding to the storage-space image; and detecting cargoes in the target storage-space with the inference detection engine to obtain the detection result.

The target storage-space refers to a storage space identified from the storage-space image, and the stored cargoes in the target storage-space need to be detected. The detection result is obtained by detecting cargos in the target storage-space through the inference detection engine, and the detection result contains the identified storage-space and the cargo status in the storage space, such as location, categories, and the number of the cargoes.

In some implementations, the step "determining a target storage-space by detecting the at least one storage-space corresponding to the storage-space image" includes, but is not limited to, determining an image acquisition device corresponding to the storage-space image (or called target image-acquisition-device); obtaining a pre-configuration file, and obtaining from the pre-configuration file storage-space information corresponding to the target image-acquisition-device; and determining the target storage-space, by positioning the at least one storage-space corresponding to the storage-space image according to the storage-space information.

The target image-acquisition-device refers to an image acquisition device which took the storage-space image, the storage-space information is obtained by performing calibration on a sample storage-space image, and the sample storage-space image is obtained by performing image acquisition on the at least one storage-space with the target image-acquisition-device in advance.

Specifically, calibration is performed on an image obtained. First, the image obtained is opened with a drawing tool, and the length and width of a storage space are calculated according to pixel values (X, Y) of four corners of the storage space, so as to perform storage space planning. A storage space configuration profile is opened, and the pixel values, length, and width of the planned storage space are input into the configuration profile, and then a visualization program is opened to view the status of the storage space, for example, whether cargo exceeds the boundary of the storage pace, and make sure that the cargo state of each storage space is updated in real time.

The storage-space information contains, but is not limited to, a size (such as a length and a width of the storage space), a number, and a specific position of the storage space in the storage-space image. A specific position of the storage space in the storage-space image refers to pixel coordinates of vertexes of the storage space in a pixel coordinate system.

It should be noted that, a reference image is selected for the calibration of the storage space from a reference image set obtained by each image acquisition device, the reference image selected is an image which contains a complete storage-space in the field of view of the image acquisition device and has complete and clear features. If the reference image can also be used to calibrate the security area for alarming, the image selected should contain a complete storage-space and security area in the field of view of the image acquisition device and have complete and clear features. After selecting an appropriate reference image, the calibrating method is to use a drawing tool or a calibration tool to draw vertices of each storage space and vertices of the security area in the reference image, and write the pixel coordinates of such vertices into the pre-configuration file. The storage space is generally rectangular, accordingly, the number of vertices is 4, the security area may be polygonal, the specific number of vertices can be adjusted according to actual needs, and the format of the pre-configuration file can refer to the format of the configuration file configured in the cargo inventorying software, such as XML format.

It should be noted that, the pre-configuration file is used to set a specific space and a security area of a storage space, where data of the specific space and security area are defined through the above steps. Since the image acquisition device is also fixed in the warehouse after the image acquisition device is arranged on site, the pre-configuration file is used to draw the storage space and the security area into the storage-space image shot by the image acquisition device to present positions of the storage space and the security area in the storage-space image.

Specifically, the pre-configuration file is obtained after determining the target image-acquisition-device corresponding to the storage-space image. Next, the specific position of the storage space in the storage-space image, i.e., the pixel coordinates of vertexes of the storage space recorded in the pre-configuration file, is obtained from the pre-configuration file after obtaining the pre-configuration file. The target storage-space is obtained by calibrating the pixel coordinates of vertexes in the storage-space information into the storage-space image.

In some implementations, the result of cargo inventorying contains the number of cargoes, and the step 206 includes specifically, but is not limited to, drawing a first detection box in the storage-space image according to the detection result, where the first detection box is for positioning cargoes; determining a second detection box in the storage-space image, where the second detection box is for positioning the target storage-space; and determining the number of the cargoes in the target storage-space according to a coincidence degree of the first detection box and the second detection box.

Specifically, the specific position of each cargo in the storage-space image can be determined according to the detection result, and the first detection box for positioning cargoes is drawn according to the specific position of each cargo in the storage-space image. For example, the first detection box can be drawn into the storage space image according to the pixel coordinates of vertexes of each cargo. The second detection box for positioning the target storage-space can be drawn into the storage space image according to the pixel coordinates of vertexes of the target storage-space. The first detection box can be represented by a coordinate of each vertex, a length and a width. The first detection box may be a polygonal box, such as a rectangular box. The second detection box can also be represented by a coordinate of each vertex, a length and a width. The second detection box may be a polygonal box, such as a rectangular box.

Specifically, according to the calculated coincidence degree of the first detection box and the second detection box, it is determined that the first detection box is located in the second detection box if the coincidence degree is greater than or equal to the preset coincidence range, and thus it is further determined that cargoes corresponding to the first detection box are located in the target storage-space corresponding to the second detection box. It is determined that the first detection box is not located in the second detection box if the coincidence degree is smaller than the preset coincidence range, and thus it is further determined that cargoes corresponding to the first detection box are not located in the target storage-space corresponding to the second detection box. The number of the cargoes in the target storage-space is determined, specifically, the number of the first detection box can be calculated, where the coincidence degree of the first detection box and the second detection box is greater than or equal to the preset coincidence range.

An example is given below for convenience of understanding. It is assumed that the preset coincidence range is 40%, the first detection box includes a detection box A and a detection box B, where the detection box A corresponds to cargo A, and the detection box B corresponds to cargo B. The detection box A is located in the second detection box, i.e., cargo A is located in the target storage-space, if the coincidence range of the detection box A and the second detection box is 50% which is greater than the preset coincidence range. The detection box B is not located in the second detection box, i.e., cargo B is not located in the target storage-space, if the coincidence range of the detection box B and the second detection box is 20% which is smaller than the preset coincidence range. In conclusion, it can be determined that there is only cargo A in the target storage-space, and the number of the cargo is 1.

In some implementations, since pixel coordinates of vertexes of the security area are also calibrated in the pre-configuration file, a third detection box for positioning the security area can also be determined, and a person or a forklift in the third detection box can be identified through the inference detection engine.

In some implementations, as illustrated in FIG. 3, before running the software that can take an inventory of cargoes, the image acquisition device needs to be installed above the platform at an appropriate height to ensure that all cargoes in the storage-space can be fully displayed in the field of view of the image acquisition device. The image acquisition device and the corresponding server are connected under the same network to make sure that the server can access all image acquisition devices. It is needed to collect images after installing all image acquisition devices. Specifically, it is needed to capture the whole process of the cargo removing in the field of view of each image acquisition device, and label the collected images to obtain the image set. The labeled image set is imported into the neural network model to be trained to obtain PT model file, and the PT model file is converted into ENGINE file to obtain the converted inference-detection-engine. Additionally, it is further needed to select one image shot by each image acquisition device which is used for calibrating the storage-space and the security area to obtain the configuration file. Next, the set configuration file and the converted inference-detection-engine are put into the software, that is, the set configuration file and the converted inference-detection-engine are put into a folder where the software is located, and then the software can run once the software icon is clicked on.

It should be noted that, multiple image acquisition devices can be considered for being installed for image acquisition to ensure that cargoes in all storage-spaces of the storage-space area can be detected, where one storage-space area includes multiple storage-spaces. Each image acquisition device can capture one or more storage-spaces and cargoes corresponding to the storage-space at the same time. The actual number of image acquisition devices can be determined according to the number of on-site storage-spaces. Multiple storage-space images covering the whole storage-space area can be obtained by simultaneous capture on storage-spaces of the storage-space area through multiple image acquisition devices. A more comprehensive detection result can be obtained by detecting the cargoes in the multiple storage-space images through the same industrial personal computer, and thus improving the accuracy of cargo inventorying.

It should be noted that, after the configuration file and model are configured in the same site, it is no longer necessary to repeat the steps of file configuration and model training. For different sites, the files need to be reconfigured and the models need to be re-trained.

In some implementations, as illustrated in FIG. 4, data collected by the image acquisition device can be input to the server through network cables after running the software. Next, the server starts a thread for each image acquisition device to enable the image capturing function and decodes the extracted images to store the decoded image in the image buffer. When there is an image in the image buffer, the cargo inference thread, i.e., the tensorrt inference thread is woken up to perform inference detection. Each image which is performed inference detection on through the cargo inference thread is stored in a next intermediate container, that is, the inference buffer. When there is an image in the inference buffer, the display thread is woken up, and then the inferring result is drawn into the original image and presented.

It should be understood that, although the steps in the flow charts involved in implementations described above are shown sequentially as indicated by the arrows, the steps are not necessarily executed sequentially as indicated by the arrows. Unless explicitly stated in the disclosure, there is no strict order restriction on execution of the steps, and the steps can be executed in other order. Moreover, at least some steps in the flow charts involved in the implementations described above may include multiple steps or phases, which are not necessarily completed at the same time, but can be executed at different time. The execution of these steps or phases is not necessarily sequential, but can be executed in turn or alternately with other steps or at least part of steps or phases in other steps.

Based on the same inventive concept, a device for cargo inventorying for realizing the above-mentioned method for cargo inventorying is further provided in implementations of the disclosure. The implementation scheme for solving the problem which is provided through the device is similar to the implementation scheme recorded in the above method, so the specific limitations in the implementations of one or more devices for cargo inventorying provided below can refer to the above limitations on the method for cargo inventorying, which are not be repeated here.

Figure 5:
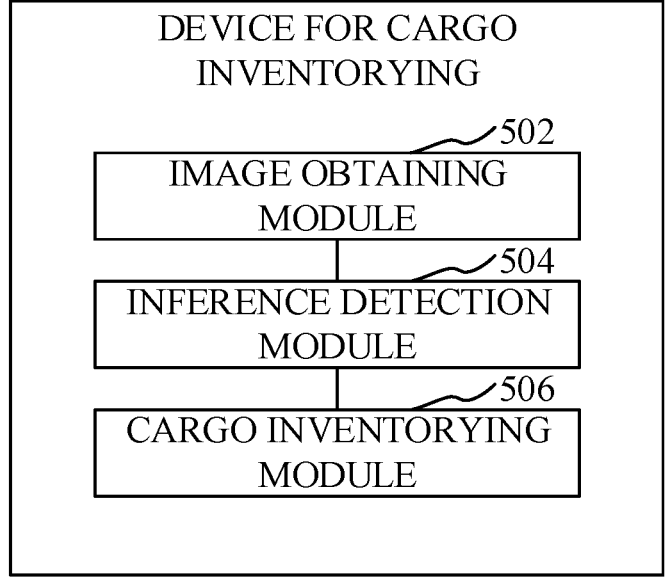
FIG. 5 is structural block diagram of a device for cargo inventorying provided in some implementations.

In an implementation, as illustrated in FIG. 5, a device for cargo inventorying is provided. The device includes an image obtaining module 502, an inference detection module 504, and a cargo inventorying module 506.

The image obtaining module 502 is used to obtain a storage-space image. The storage-space image is obtained by performing image acquisition on at least one storage-space where cargoes are stored. The storage-space image in the disclosure is obtained by performing image acquisition with an image acquisition device. The image acquisition device refers to a device having a photographing function, and may be, but is not limited to, various cameras and mobile devices integrated with shooting apparatuses such as cameras.

As an implementation, the image obtaining module 502 can be connected with the image acquisition device in a wired or wireless manner, or the image obtaining module 502 can be integrated in the image acquisition device, or formed with the image acquisition device as a whole, which is not limited specially in the disclosure.

The inference detection module 504 is used to perform inference detection on the storage-space image to obtain a detection result.

The cargo inventorying module 506 is used to emphasize the cargoes in the storage-space image according to the detection result to obtain a result of cargo inventorying on the storage space.

The device for cargo inventorying in the disclosure is used to obtain the storage-space image obtained by performing image acquisition on the storage-space where cargoes are stored; obtain the detection result by performing inference detection on the storage-space image; and obtain the result of cargo inventorying on the storage space by emphasizing cargoes in the storage-space image according to the detection result. The detection result can be produced automatically by performing inference detection on the storage-space image. Based on the detection result produced automatically, it is also able to automatically emphasize the cargoes in the storage-space image and realize automatic inventory of cargoes through programmed automatic-control, thereby improving the efficiency of inventory of cargoes.

In some implementations, the detection result is obtained by performing inference detection on the storage-space image with the inference detection engine. The inference detection engine is obtained by serializing model parameters of the cargo detection model trained through deep learning, and an inference detection speed of the inference detection engine is superior to the cargo detection model.

In some implementations, the image obtaining module 502 is further used to obtain the storage-space image collected by the image acquisition device and store the storage-space image in an image buffer. The inference detection module 504 is further used to wake up a cargo inference thread to obtain the storage-space image from the image buffer, and call the inference detection engine to perform inference detection on the storage-space image to obtain the detection result.

In some implementations, the device for cargo inventorying further includes an image-buffering module. The image-buffering module is used to control, through the image collection thread, the at least one image acquisition device to stop image acquisition within a preset time period, when the number of images stored in the image buffer has reached a preset threshold.

In some implementations, the inference detection module 504 includes a storage-space detection unit and a cargo detection unit. The storage-space detection unit is used to determine a target storage-space by detecting the at least one storage-space corresponding to the storage-space image (short for storage-space detection). The cargo detection unit is used to detect cargoes in the target storage-space with the inference detection engine to obtain the detection result.

In some implementations, the inference detection module 504 further includes a security-area identification unit. The security-region identification unit is used to identify an object and/or the number of the object in the security area, such as a person and the number of person, additionally or alternatively, a forklift, and the number of the forklift. The security-area identification unit gives an alarm upon identifying that a person or a forklift has entered the security area, and thereby playing the role of alarm prompt.

In some implementations, the storage-space detection unit is further used for determining an image acquisition device corresponding to the storage-space image; obtaining a pre-configuration file, and obtaining from the pre-configuration file storage-space information corresponding to the image acquisition device, where the storage-space information is obtained by performing calibration on a sample storage-space image, and the sample storage-space image is obtained by performing image acquisition on the at least one storage-space with the target image-acquisition-device in advance; and determining the target storage-space, by positioning the at least one storage-space corresponding to the storage-space image according to the storage-space information (short for storage-space position).

In some implementations, the cargo inventorying module 506 is further used for drawing a first detection box in the storage-space image according to the detection result, where the first detection box is for positioning cargoes; determining a second detection box in the storage-space image, where the second detection box is for positioning the target storage-space; and determining the number of the cargoes in the target storage-space according to a coincidence degree of the first detection box and the second detection box.

Module division of the device for cargo inventorying mentioned above is merely used as examples for illustration.

In other implementations, the device for cargo inventorying can be divided into different modules as required to complete all or part of the functions of the device for cargo inventorying.

Modules of the device for cargo inventorying mentioned above may be implemented wholly or partly by software, hardware, and combinations thereof. Each module may be embedded in or independent of a processor of the computer device in the form of hardware, or may be stored in a memory of the computer device in the form of software, so that the processor invokes the modules to execute the operations corresponding to the above modules.

In some implementations, a computer device is provided. The computer device may be the server in FIG. 1 with an internal structure illustrated in FIG. 6. The computer device includes a processor, a memory, and a network interface which are connected through a system bus. The processor of the computer device is used to provide computing and control capacities. The memory of the computer device includes a nonvolatile storage medium and an internal memory. The nonvolatile storage medium stores an operating system, a computer program, and a database. The internal storage device provides an environment for the running of the operating system and the computer program stored in the nonvolatile storage medium. The database of the computer device is used to store image information and storage-space information. The network interface of the computer device is used for being connected and communicating with external terminals through network. The computer program is executed by the processor to realize a method for cargo inventorying.

Figure 6:
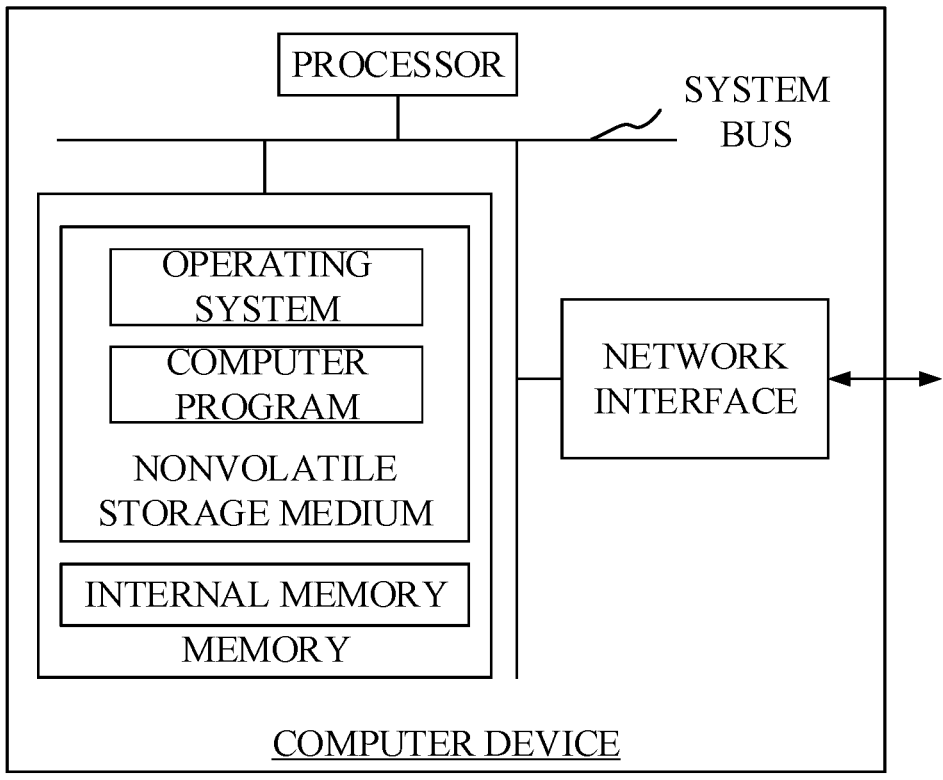
FIG. 6 is an internal structure diagram of a computer device provided in some implementations.

Specifically, the memory illustrated in FIG. 6 stores the computer program. The processor is able to execute the method for cargo inventorying mentioned above when running the computer program. Specifically, the processor is able to obtain a storage-space image, where the storage-space image is obtained by performing image acquisition on at least one storage-space where cargoes are stored; obtain a detection result by performing inference detection on the storage-space image; and obtain a result of cargo inventorying on the storage space by emphasizing cargoes in the storage-space image according to the detection result. The emphasizing includes at least one of: highlighting, color filling, or text marking for the cargoes identified, and drawing an area detection box corresponding to the cargoes according to the cargoes identified.

In terms of performing inference detection on the storage-space image, the processor is configured to perform inference detection on the storage-space image with an inference detection engine, where the inference detection engine is obtained by serializing model parameters of a cargo detection model trained through deep learning, and an inference detection speed of the inference detection engine is superior to the cargo detection model.

The cargo detection model is obtained by the following training, and the training includes capturing process images during cargo removing in any storage-space with an image acquisition device corresponding to the any storage-space, and generating a training-image set according to the process images; and obtaining the cargo detection model by training an original detection model according to the training-image set, where the original detection model may be a yolov5 model.

In some implementations, the storage-space is obtained by performing image acquisition with at least one image acquisition device.

In terms of obtaining the storage-space image, the processor is configured to obtain the storage-space image and store the storage-space image in an image buffer. In terms of obtaining the detection result by performing inference detection on the storage-space image, the processor is configured to wake up a cargo inference thread to obtain the storage-space image from the image buffer, and call the inference detection engine to perform inference detection on the storage-space image to obtain the detection result.

In some implementations, the storage-space image is obtained by an image collection thread started for the at least one image acquisition device, and the processor is further configured to control, through the image collection thread, the at least one image acquisition device to stop image acquisition within a preset time period, when the number of images stored in the image buffer has reached a preset threshold.

The cargo inference thread is independent from the image collection thread, and each of the at least one image acquisition device has the image collection thread.

The at least one image acquisition device is installed above a platform, and the at least one acquisition device is installed at a height which allows all cargoes in the storage space can be fully displayed in a field of view of the at least one image acquisition device.

In some implementations, in terms of obtaining the detection result by performing inference detection on the storage-space image, the processor is configured to determine a target storage-space by detecting the at least one storage-space corresponding to the storage-space image; and detect cargoes in the target storage-space with the inference detection engine to obtain the detection result.

In some implementations, in terms of determining the target storage-space by detecting the at least one storage-space corresponding to the storage-space image, the processor is configured to determine an image acquisition device corresponding to the storage-space image; obtain a pre-configuration file, and obtain from the pre-configuration file storage-space information corresponding to the image acquisition device, where the storage-space information is obtained by performing calibration on a sample storage-space image, and the sample storage-space image is obtained by performing image acquisition on the at least one storage-space with the image acquisition device in advance; and determine the target storage-space, by positioning the at least one storage-space corresponding to the storage-space image according to the storage-space information.

In some implementations, the result of cargo inventorying includes the number of cargoes in the target storage space. In terms of obtaining the result of cargo inventorying on the storage space by emphasizing the cargoes in the storage-space image according to the detection result, the processor is configured to draw a first detection box in the storage-space image according to the detection result, where the first detection box is for positioning cargoes; determine a second detection box in the storage-space image, where the second detection box is for positioning the target storage-space; and determine the number of the cargoes in the target storage-space according to a coincidence degree of the first detection box and the second detection box.

In some implementations, the storage-space image contains image information of the at least one storage-space and image information of other areas, the other areas include a non-storage-space area, such as a security area. Based on this, the detection result includes existence or non-existence of a person or a forklift in the non-storage-space area, and the method further includes generating an alarm when there is a person or a forklift in the non-storage-space area.

The at least one image acquisition device may be a part of the computer device or an external component of the computer device.

Those of ordinary skill in the art can understand that the structure illustrated in FIG. 6 is only a block diagram of partial structures related to the solution of the disclosure, and does not constitute any limitation on the computer device applied to the solution of the disclosure. The specific computer device may include more or fewer components than illustrated or may combine certain components or have different deployment of components.

In some implementations, a computer device is further provided and includes a memory and a processor. The memory stores computer programs, and the processor is configured to execute steps of the above method implementations when running the computer programs.

In some implementations, a nonvolatile computer-readable storage medium storing computer programs is provided. A processor is configured to execute steps of the above method implementations when executing the computer programs.

In some implementations, a computer program product including computer programs is provided. A processor is configured to execute steps of the above method implementations when executing the computer programs.

It will be understood by those of ordinary skill in the art that all or a part of the process of the methods of implementations described above may be accomplished by means of a computer program to instruct associated hardware, and the computer programs may be stored in a nonvolatile computer-readable storage medium. The process of implementations of the methods mentioned above may be included when the computer programs are executed. Any reference to a memory, a database or another medium used in implementations provided in the disclosure may include at least one of nonvolatile and volatile memory. The nonvolatile memory may include a read-only memory (ROM), a magnetic tape, a soft disc, a flash memory, an optical memory, a high-density embedded nonvolatile memory, a resistive random access memory (ReRAM), a magnetoresistive random access memory (MRAM), a ferroelectric random access memory (FRAM), a phase change memory (PCM), and a graphene-based memory. The volatile memory may include a random access memory (RAM) or an external cache, etc. As illustration rather than limitation, RAM may adapt various forms, such as a static random access memory (SRAM) or a dynamic random access memory (DRAM). The database involved in implementations provided in the disclosure may be at least one of the relational database and the non-relational database. The non-relational database may be, but is not limited to, a blockchain-based distributed database. The processors involved in implementations provided in the disclosure may be, but are not limited to, general-purpose processors, central processing units, graphics processing units, digital signal processors, programmable logic devices, data processing logic devices based on quantum computing, etc.

The technical features of the above implementations can be randomly combined. For simplicity of illustration, all possible combinations of the technical features of the above implementations have not been described. However, as long as there is no contradiction in the combination of these technical features, it should be regarded as falling within the scope of the description.

Only several embodiments of the disclosure are described through the above implementations, which are described specific and detailed but cannot be understood as a limitation on the patent scope of the disclosure. It should be noted that for those of ordinary skill in the art, certain embellishments and improvements can be made without departing from the principles of the disclosure, which shall also fall within the protection scope of the disclosure. Therefore, the protection scope of the disclosure shall be subject to the appended claims.

What is claimed is:

1. A method for cargo inventorying performed by a computer, comprising:
   obtaining a storage-space image, wherein the storage-space image is obtained by performing image acquisition on at least one storage-space where cargoes are stored;
   obtaining a detection result by performing inference detection on the storage-space image;
   drawing a first detection box in the storage-space image according to the detection result, wherein the first detection box is for positioning cargoes;
   determining a second detection box in the storage-space image, wherein the second detection box is for positioning the target storage-space; and
   determining a number of the cargoes in the target storage-space according to a coincidence degree of the first detection box and the second detection box.

2. The method of claim 1, wherein performing inference detection on the storage-space image comprises:
   performing inference detection on the storage-space image with an inference detection engine, wherein the inference detection engine is obtained by serializing model parameters of a cargo detection model trained through deep learning, and an inference detection speed of the inference detection engine is superior to the cargo detection model.

3. The method of claim 2, wherein:
   the storage-space image is obtained by performing image acquisition with at least one image acquisition device;
   obtaining the storage-space image comprises:
   obtaining the storage-space image and storing the storage-space image in an image buffer; and
   obtaining the detection result by performing inference detection on the storage-space image comprises:
   waking up a cargo inference thread to obtain the storage-space image from the image buffer, and calling the inference detection engine to perform inference detection on the storage-space image to obtain the detection result.

4. The method of claim 3, wherein the storage-space image is obtained by an image collection thread started for the at least one image acquisition device, and wherein the method further comprises:
   controlling, through the image collection thread, the at least one image acquisition device to stop image acquisition within a preset time period, when the number of images stored in the image buffer has reached a preset threshold.

5. The method of claim 4, wherein the cargo inference thread is independent from the image collection thread, and wherein each of the at least one image acquisition device is configured with an image collection thread.

6. The method of claim 3, wherein the at least one image acquisition device is installed above a platform, and wherein the at least one acquisition device is installed at a height which allows all cargoes in the storage space can be fully displayed in a field of view of the at least one image acquisition device.

7. The method of claim 2, wherein obtaining the detection result by performing inference detection on the storage-space image comprises:

determining a target storage-space by detecting the at least one storage-space corresponding to the storage-space image; and detecting cargoes in the target storage-space with the inference detection engine to obtain the detection result.

8. The method of claim 7, wherein determining the target storage-space by detecting the at least one storage-space corresponding to the storage-space image comprises:

determining an image acquisition device corresponding to the storage-space image;

obtaining a pre-configuration file, and obtaining from the pre-configuration file storage-space information corresponding to the image acquisition device, wherein the storage-space information is obtained by performing calibration on a sample storage-space image, and wherein the sample storage-space image is obtained by performing image acquisition on the at least one storage-space with the image acquisition device in advance; and determining the target storage-space, by positioning the at least one storage-space corresponding to the storage-space image according to the storage-space information.

9. The method of claim 2, further comprising training the cargo detection model, and wherein the training comprises:

capturing process images during cargo removing in any storage-space by an image acquisition device corresponding to the any storage-space, and generating a training-image set according to the process images; and obtaining the cargo detection model by training an original detection model according to the training-image set.

10. The method of claim 9, wherein the original detection model is a yolov5 model.

11. The method of claim 1, wherein the storage-space image contains image information of the at least one storage-space and image information of other areas, and wherein the other areas comprise a non-storage-space area.

12. The method of claim 11, wherein the detection result comprises: existence or non-existence of a person or a forklift in the non-storage-space area, and wherein the method further comprises:

generating an alarm when there is a person or a forklift in the non-storage-space area.

13. The method of claim 1, wherein emphasizing cargoes in the storage-space image according to the detection result comprises at least one of: highlighting, color filling, or text marking for the cargoes identified, and drawing an area detection box corresponding to the cargoes according to the cargoes identified.

14. A device for cargo inventorying, comprising:

a processor and a memory storing computer programs, wherein when executing the computer programs, the processor is configured to:

obtain a storage-space image, wherein the storage-space image is obtained by performing image acquisition on at least one storage-space where cargoes are stored;

obtain a detection result by performing inference detection on the storage-space image;

draw a first detection box in the storage-space image according to the detection result, wherein the first detection box is for positioning cargoes;

determine a second detection box in the storage-space image, wherein the second detection box is for positioning the target storage-space; and determine a number of the cargoes in the target storage-space according to a coincidence degree of the first detection box and the second detection box.

15. The device of claim 14, wherein in terms of performing inference detection on the storage-space image, the processor is configured to:

perform inference detection on the storage-space image with an inference detection engine, wherein the inference detection engine is obtained by serializing model parameters of a cargo detection model trained through deep learning, and wherein an inference detection speed of the inference detection engine is superior to the cargo detection model.

16. The device of claim 15, wherein:

the storage-space image is obtained by performing image acquisition with at least one image acquisition device;

in terms of obtaining the storage-space image, the processor is configured to:

obtain the storage-space image and store the storage-space image in an image buffer; and in terms of obtaining the detection result by performing inference detection on the storage-space image, the processor is configured to:

wake up a cargo inference thread to obtain the storage-space image from the image buffer, and call the inference detection engine to perform inference detection on the storage-space image to obtain the detection result.

17. The device of claim 16, wherein the storage-space image is obtained by an image collection thread started for the at least one image acquisition device, and wherein the processor is further configured to:

control, through the image collection thread, the at least one image acquisition device to stop image acquisition within a preset time period, when the number of images stored in the image buffer has reached a preset threshold.

18. The device of claim 15, wherein in terms of obtaining the detection result by performing inference detection on the storage-space image, the processor is configured to:

determine a target storage-space by detecting the at least one storage-space corresponding to the storage-space image; and detect cargoes in the target storage-space with the inference detection engine to obtain the detection result.

19. A nonvolatile computer-readable storage medium storing computer programs, wherein when executing the computer programs, a processor is configured to:

obtain a storage-space image, wherein the storage-space image is obtained by performing image acquisition on at least one storage-space where cargoes are stored;

obtain a detection result by performing inference detection on the storage-space image;

draw a first detection box in the storage-space image according to the detection result, wherein the first detection box is for positioning cargoes;

determine a second detection box in the storage-space image, wherein the second detection box is for positioning the target storage-space; and determine a number of the cargoes in the target storage-space according to a coincidence degree of the first detection box and the second detection box.

\* \* \* \* \*